(12) United States Patent
Chang et al.

(10) Patent No.: US 10,204,343 B2
(45) Date of Patent: Feb. 12, 2019

(54) MULTI-CHANNEL CUSTOMER IDENTIFICATION

(71) Applicant: [24]7.AI, INC., San Jose, CA (US)

(72) Inventors: Andrew Chang, Palo Alto, CA (US); Dan Reed, Campbell, CA (US); Quang Nguyen, Union City, CA (US); A. Kranthi Mitra, Hyderabad (IN)

(73) Assignee: [24]7.AI, INC., San Jose, CA (US)

( * ) Notice: Subject to any disclaimer, the term of this patent is extended or adjusted under 35 U.S.C. 154(b) by 595 days.

(21) Appl. No.: 13/897,233

(22) Filed: May 17, 2013

(65) Prior Publication Data

US 2014/0006293 A1 Jan. 2, 2014

Related U.S. Application Data

(60) Provisional application No. 61/649,190, filed on May 18, 2012.

(51) Int. Cl.
*G06Q 30/00* (2012.01)
*G06Q 30/02* (2012.01)

(52) U.S. Cl.
CPC ....... *G06Q 30/016* (2013.01); *G06Q 30/0202* (2013.01)

(58) Field of Classification Search
CPC ... G06Q 10/063; G06Q 30/16; G06Q 30/0201
USPC ...................................................... 705/304
See application file for complete search history.

(56) References Cited

U.S. PATENT DOCUMENTS

| | | | |
|---|---|---|---|
| 6,711,682 B1 * | 3/2004 | Capps | 713/184 |
| 6,760,727 B1 * | 7/2004 | Schroeder et al. | |
| 7,664,644 B1 * | 2/2010 | Tur | G10L 15/1822 704/257 |
| 8,185,608 B1 * | 5/2012 | York | G06Q 30/02 709/203 |
| 2007/0240206 A1 | 10/2007 | Wu et al. | |
| 2008/0222712 A1 * | 9/2008 | O'Connell et al. | 726/7 |
| 2011/0099048 A1 | 4/2011 | Weiss et al. | |
| 2011/0255688 A1 * | 10/2011 | Spalink et al. | 380/29 |
| 2011/0276382 A1 | 11/2011 | Ramchandani et al. | |
| 2012/0072264 A1 * | 3/2012 | Perna | G06Q 30/0201 705/7.32 |
| 2012/0117119 A1 * | 5/2012 | Kevin | 707/792 |
| 2012/0239488 A1 * | 9/2012 | Zimmerman | G06Q 30/02 705/14.41 |

(Continued)

FOREIGN PATENT DOCUMENTS

WO    WO 2011101848 A1 *  8/2011

OTHER PUBLICATIONS

Rob Schapire, COS 511:Theoretical Machine Learning, Feb. 4, 2008 (Year: 2008).*

(Continued)

*Primary Examiner* — Maria C Santos-Diaz
(74) *Attorney, Agent, or Firm* — Perkins Coie LLP (57) ABSTRACT

Unique customer identification and behavior is linked between either concurrent or sequential channels of engagement. Unique identifiers are created, captured, and/or passed between these multiple contact channels, e.g. Web, mobile, IVR, phone, automotive, television, to identify and tag the customer and their context, e.g. history, pass behavior, steps progressed, obstacles and/or issues encountered, etc., uniquely.

19 Claims, 5 Drawing Sheets

(56) References Cited

U.S. PATENT DOCUMENTS

| | | | | |
|---|---|---|---|---|
| 2012/0317217 | A1* | 12/2012 | Lavy | G06Q 10/10 |
| | | | | 709/206 |
| 2013/0094647 | A1* | 4/2013 | Mauro | H04M 3/5141 |
| | | | | 379/265.09 |
| 2013/0156170 | A1* | 6/2013 | Springer | H04M 3/493 |
| | | | | 379/88.22 |
| 2013/0268468 | A1* | 10/2013 | Vijayaraghavan | G06N 99/005 |
| | | | | 706/12 |
| 2014/0297268 | A1* | 10/2014 | Govrin | G06Q 40/02 |
| | | | | 704/9 |

OTHER PUBLICATIONS

Tom M. Mithcell, The Discipline of Machine Learning, Jul. 2006 (Year: 2006).*
Simon A. Levin, Predicting consumer behavior with Web search, Sep. 27, 2010, 1-9 (Year: 2010).*
"Socialblade", YouTube Username Generator; retrieved online on Jul. 16, 2013 from url: http://web.archive.org/we/20111207074414/http://socialblade.com/youtube/namegen, Dec. 7, 2011, 3 pages.

* cited by examiner

MULTI-CHANNEL CUSTOMER IDENTIFICATION

CROSS REFERENCE TO RELATED APPLICATIONS

This application claims priority to U.S. provisional patent application Ser. No. 61/649,190, filed May 18, 2012, which application is incorporated herein in its entirety by this reference thereto.

BACKGROUND OF THE INVENTION

Technical Field

The invention relates to customer identification and linkage across and between channels, contact methods, and devices used by the customer. More particularly, the invention relates to multi-channel customer identification which links journeys for the same customer, while making the customer experience intuitive.

Description of the Background Art

Broadly defined, an identification number is a numeral or string of numerals that is used for identification. Thus, there is, for example, a Taxpayer Identification Number (TIN), which is an identification number used by the Internal Revenue Service (IRS) in the administration of tax laws. It is issued either by the Social Security Administration (SSA) or by the IRS. A Social Security number (SSN) is issued by the SSA, whereas all other TINs are issued by the IRS.

Taxpayer Identification Numbers include a, Social Security Number (SSN), Employer Identification Number (EIN), Individual Taxpayer Identification Number (ITIN) Taxpayer Identification Number for Pending U.S. Adoptions (ATIN), and Preparer Taxpayer Identification Number (PTIN).

Then there is the personal identification number (PIN), which is a secret numeric password shared between a user and a system that can be used to authenticate the user to the system. Typically, the user is required to provide a non-confidential user identifier or token, i.e. the user ID, and a confidential PIN to gain access to the system. Upon receiving the user ID and PIN, the system looks up the PIN, based upon the user ID, and compares the looked-up PIN with the received PIN. The user is granted access only when the number entered matches with the number stored in the system. Hence, despite the name, a PIN does not personally identify the user.

There is also a Collegewide ID (CWID), which is a college-wide identification number (8 digits) that can be used in place of a Social Security number; California ID numbers the issued to generators, transporters, and disposal facilities not regulated by the U.S. Environmental Protection Agency (U.S. EPA) for the purpose of tracking hazardous waste; a vehicle identification number, which could be the motor number, serial number, or other distinguishing number, letter, mark, character, or datum, or any combination thereof, required or employed by the manufacturer or a state vehicle department for the purpose of uniquely identifying a motor vehicle or motor vehicle part or for the purpose of registration; and so on ad infinitum.

People are awash in identification numbers and the like, each service and each channel of communication requiring a different identification number and each service and each channel of communication having no knowledge of a user's other identification numbers in other services and for other communications channels. While, it is important to maintain security, especially with the widespread use of, and fraud attendant with, the Internet, identification numbers currently are one-dimensional, and are provided for single purpose, for all except a very narrow use. For example, personal factors and contextual use of various communications channels can affect the security requirements for authenticating a particular person for a particular purpose, but most current identification regimes make no attempt to cross channels and/or services.

While, to a certain extent Facebook® ID and others provide a single representation of identity, such approach does not establish a linkage across and between channels, contact methods, and devices for an individual, but merely establishes identity across multiple domains. For example, an individual may try to solve a specific issue with a services firm. As a follow up, the individual may contact the firm via same channel or another channel to check on the status of the issue. Currently, the individual must be authenticated for each contact and provide a request number that was received during a previous interaction to identify a specific transaction so that current status can be provided.

In the art, all of the associated interaction data is collected via appropriate means, but it is not available across and between channels, contact methods, and devices. Thus, the same customer might be interacting with others, including the customer's friends and/or peers, via other non-customer channels, such as posting social media sites, blogs, instant messaging email, etc. regarding their experiences with the firm. In certain cases, when the customer provides specific access rights, or the information is publicly available, it is possible to collect the associated data, such as likes, posts, comments, updates, connections, interests etc. via appropriate methods.

It would be advantageous to provide improved flexibility and increased options in connection with user identification during user interaction with various systems over various channels in connection with various devices. It would also be advantageous to reduce customer effort in creating and using such identification.

SUMMARY OF THE INVENTION

An embodiment of the invention links unique customer identification and behavior between either concurrent or sequential channels of engagement and different devices. Linkages are created across channels and devices within the same session, as well as across sessions. An embodiment of the invention makes these links probabilistically based on machine learning and statistical models driven by behavior and other attributes of customer journeys.

Unique identifiers are created, captured, and/or passed between these multiple contact channels, e.g. Web, mobile, interactive voice response (VR), phone, automotive, television, to identify and tag the customer and their context, e.g. history, past behavior, steps progressed, obstacles and/or issues encountered, etc., uniquely.

An embodiment of the invention accounts for imperfections when identifying an individual. In this embodiment, making exact linkages allows for different levels of confidence based on statistical and/or probabilistic scoring of accuracy and/or certainty and unlocking different levels of access, permissions, and empowerments correlated to the level of confidence in the linkage and/or identification of the unique individual.

DETAILED DESCRIPTION OF THE INVENTION

An embodiment of the invention first identifies characteristics, i.e. data, from within customer behavior which can be clustered. The characteristics are used, either deterministically or probabilistically, to identify and label a unique customer. A linkage of that unique customer is then enabled across channels, devices, within and across sessions.

For example, an embodiment of the invention identifies a specific user who is looking for a specific product from a particular IP address on a mobile device and who, during the same instance, i.e. within a small time period, is looking for the same product from the same IP address and on the same Website, but from a laptop instead of the mobile device, to make a purchase. This specific scenario is based on the fact that the inventive model takes into account the user's journey on the mobile device, the IP address uniqueness, and product that the user looked at within the Website. Based on various unique identifiers, such as the IP address, user-agent, Web cookies, third party Web cookies, order IDs, request IDs, various Personally identifiable information (PII), mobile device identifiers, etc. a session can be tied across channels, firms, and devices, as well as with non-support channels. Presently, the ties are created based on a strict identifier, such as an SMS-based or email-based unique identifier or request identifier, cookies, and various PII. This constrains the number of customers who can be tracked to a significant extent and, in turn, the personalization that can be offered.

In another example, authenticated customers describe a problem on-line and then call as follow up. Based on the ANI and an authenticated ID mapping present in a CRM system, a merchant knows that this is same customer and can then link the customer's journeys.

In another example involving an unauthenticated customer, the customer is trying to login for online services, such as bill payment, etc., but forgets his password and has to call to specific number to unlock his account. Though not authenticated, it is known the customer used a specific 'user id' which can be mapped to a specific ANI as per the CRM data. Thus, the customer identity can be established.

Further discussion of cross channel linking is provided in commonly assigned U.S. patent application Ser. No. 13/763,456, filed Feb. 8, 2013 (Method And Apparatus for Linking User Sessions and Establishing Identity Across Channels; attorney docket no. 247C0047), which application is incorporated herein in its entirety by this reference thereto.

An embodiment of the invention uniquely identifies customers as they travel between and amongst contact channels in both sales and service scenarios. The creating, passing, and matching of unique identifiers to unique customers enables the seamless transfer of context, experience, history, action, information, and identification between the historically silo'ed separate communication channels within the business and/or enterprise that consumers typically use to engage with enterprises and/or businesses. Examples of such channels include speech, phone, IVR, Web self-service, email, chat, mobile, social, etc. For purposes of the discussion herein, a "channel" implies a combination of a communication mode and a device.

An embodiment of the invention addresses the problem of unique identification, both in the case where the customer has not provided any identification information, such as name, telephone number, email address, etc., as well as in the case when the customer has provided some identification, such as login, user ID, account number, telephone number, etc.

An embodiment of the invention creates a set of easy and low effort options for a customer that enable customers to associate themselves to a unique identifier, which can then be easily passed between and amongst different business enterprise systems and channels (see FIG. 2), either within one company or amongst a set of companies, along with a set of associated meta-data capturing their context, e.g. journey, intent, actions, steps, experience to date, historical behavior, preferences, etc. This enables personalized, predictive, focused and effective sales and service geared to the specific individual's need. Once the system is able to track customers across session, a unique identifier can be associated with the customer, for example ANIs or Web cookies can be identified as belonging to same customer.

Figure 2:
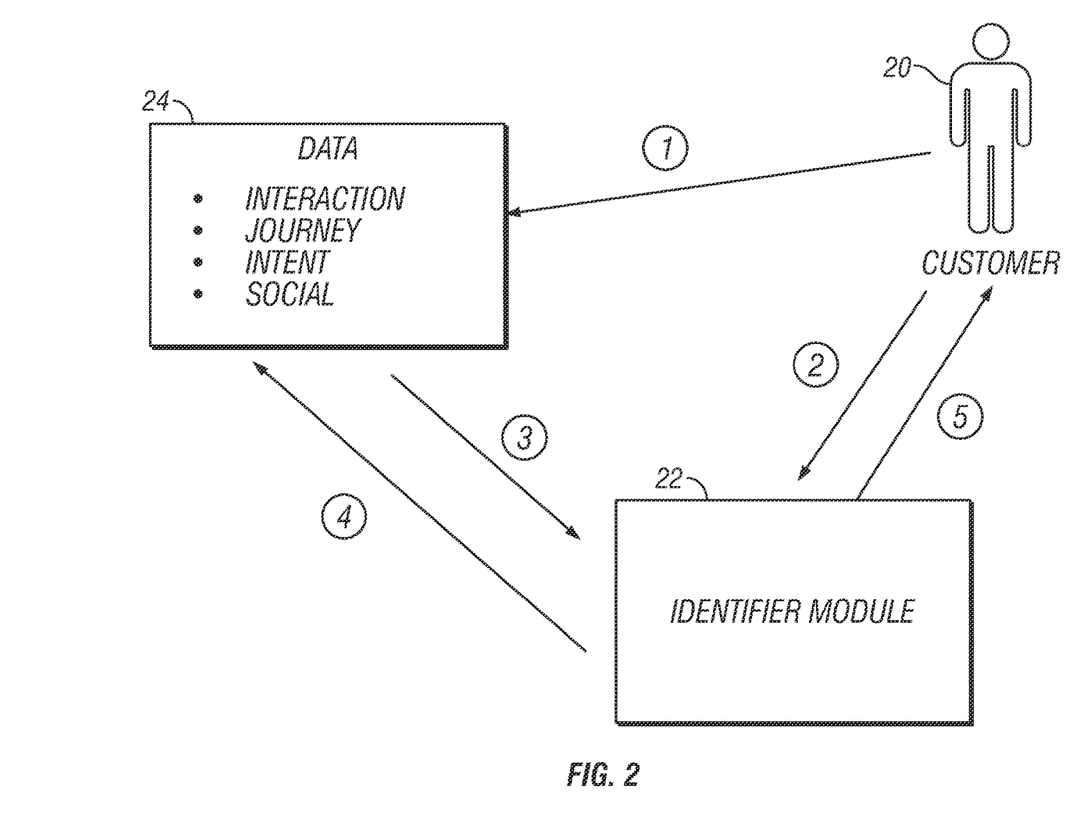
FIG. 2 is a block schematic diagram showing customer identification according to the invention.

FIG. 2 is a block schematic diagram showing customer identification according to the invention. In FIG. 2, a customer 20 is in communication with an identifier module 22 and a data management system 24 which includes such information, for example, as the customer's interactions, journey, intent, and social actions. In operation, the customer data is stored to the data management system (1), the customer provides any inputs that are required to select an identifier (2), the data management system uses data to associate different sessions and/or journeys to select appropriate options to present to the customer (3), an identifier confidence score is associated with various journeys stored in the data management system (4), and the system provides the customer with options to select an identifier (5).

Figure 3:
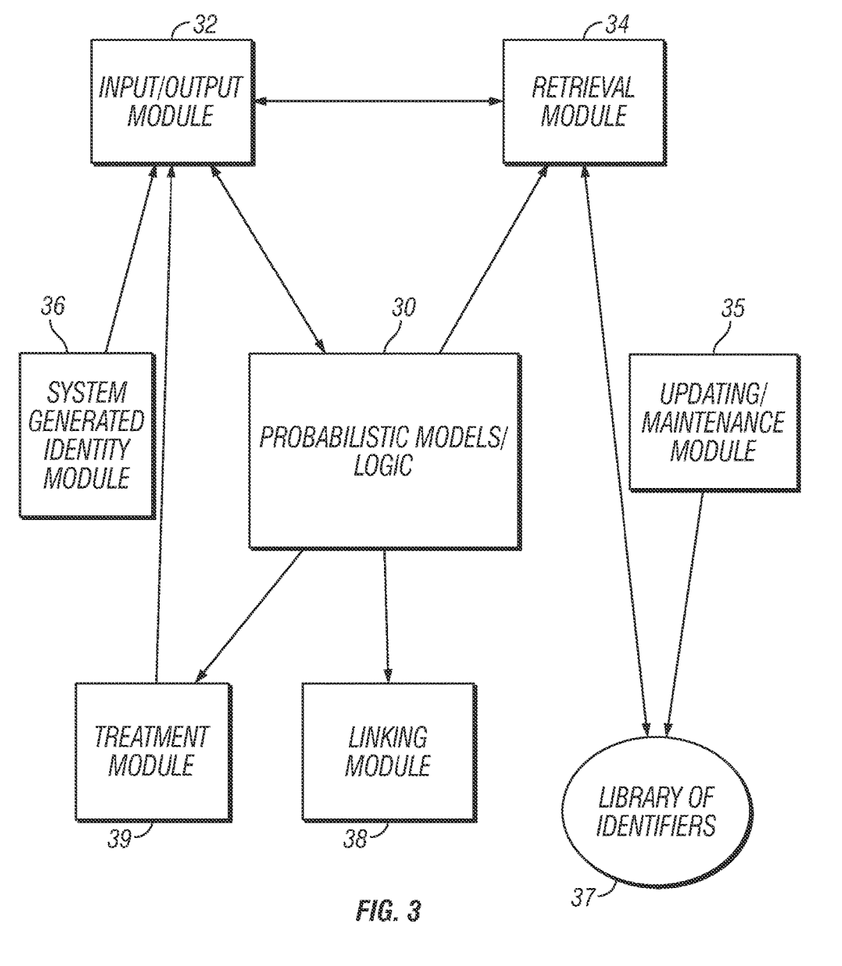
FIG. 3 is a block schematic diagram showing an identifier module according to the invention.

FIG. 3 is a block schematic diagram showing an identifier module according to the invention. In FIG. 3, the data system and customer access the module via an input/output module 32. A retrieval module 34 extracts a list of identities from the library of identifiers 37 to identify the customer. Interaction with the customer is effected by the probabilistic models and logic 30. The treatment module 39 provides the right option to the right customer to get the required data. The linking module 38 links a current interaction with past interaction based upon various identifiers and data. An updating and maintenance module 35 maintains and updates the library of identifiers. The system generated identity module 36 generates customer identities when the customer is not generated by the customer.

For a further discussion of customer context, e.g. journey, intent, actions, steps, experience to date, historical behavior, preferences, etc., as well as predictive techniques applied to such customer context see, for example, commonly assigned U.S. patent application Ser. No. 13/239,195, filed Sep. 21, 2011 (Predictive Customer Service Environment); U.S. Ser. No. 13/349,807, filed Jan. 13, 2012(Method And Apparatus For Analyzing And Applying Data Related To Customer Interactions With Social Media); U.S. Ser. No. 13/454,726, filed Apr. 24, 2012 (Method And Apparatus For Enhancing Customer Service Experience); U.S. Ser. No. 13/461,631, filed May 1, 2012 (Method And Apparatus For Analyzing And Applying Data Related To Customer Interactions With Social Media); U.S. Ser. No. 13/443,782, filed Apr. 10, 2012 (Method And Apparatus For Predictive Enrichment Of Search In An Enterprise); U.S. Ser. No. 13/599,974, filed Aug. 30, 2012 (Customer Journey Prediction And Resolution); and U.S. Ser. No. 13/852,942, filed Mar. 28, 2013 (Method And Apparatus For Intent Modeling And Prediction), each of which application is incorporated herein in its entirety by this reference thereto.

An embodiment of the invention enables automated clustering and association of a set of meta-data as a unique fingerprint for a customer, and also for automated linkage of that fingerprint to a unique identifier without any effort from the customer. An embodiment of the invention also enables the management, cataloging, tracking, logging, updating, transformation, manipulation, creation, destruction, and confidence scoring of the cluster of meta-data and each individual meta-data item for usage as a unique fingerprint.

Embodiments of the invention include, inter alia:

A catalog or library or collection of unique unassigned identifiers stored in either encrypted or free-text, that can be stored in any storage which can be accessed in real-time, e.g. a high latency, efficient data storage server in the form of a database;

A system and/or machine having the ability to create new unique identifiers and add them to the original catalog or library automatically, for example via user or machine generation, e.g. cookies or interaction numbers. Identifiers, such as songs and quotes, can be constantly updated from popular media via algorithms, e.g. algorithms that identify trends, or they can be updated by a person;

A system and/or machine having the ability to manage, e.g. create, destroy, assign, merge, split, keep track of, age, retire, de-dupe, recycle, etc., one or more catalogs of unique identifiers, e.g. in a system that is capable of maintaining a list or one or more hash tables;

A system and/or machine having the ability to score, rank, and prioritize unique identifiers by any of ease of remembrance, ease of engagement, ease of acceptance, ease of use, etc., e.g. in a system that has the capability to order a list, hash maps, such as indexing and sorting in the case of a typical database;

A system and/or machine having the ability to select and assign a unique identifier to a specific customer either randomly, by algorithm, or by program;

A system and/or machine having the ability to interact with the individual customer in one or more channels to communicate and/or assign the selected identifier to the customer uniquely, supra;

A system and/or machine which can collect, interact, request, and/or interrogate the customer for an input which can be then used as the unique identifier;

A system and/or machine which can automatically create and present a set of behaviors to increase the engagement level of the consumer to either accept the system and/or machine assigned unique identifier or provide their own identifier. This can be model driven, i.e., model is built that predicts the most intuitive experience of the customer based on historical data collected and/or specifically randomized data;

A system and/or machine which can capture, collect, store, and associate the context of a customer to the uniquely assigned identifier, in which the context can include historical behavior in one or more channels, e.g. Web, IVR, phone, mobile, social, CRM, purchase, store; intent; previous experiences, success, failure, satisfaction and/or complaints; browsing, purchasing, servicing, social interactions, credit, viewing actions, and behaviors and sequences; preferences; journeys; progress, cart and/or order contents; status; etc.;

A system and/or machine which can manage, optimize, and recycle either a limited or unlimited number of unique identifiers to optimize performance, access, storage, effectiveness, e.g. ease of memory, ease of effort to use by the consumer, management of uniqueness, or other desired metrics based on a set of parameters that can include, e.g, age, usage, clean and/or dirty, i.e. the identifier has been assigned already to a customer, time of day, seasonality, product, customer segment, etc.;

A system and/or machine can share, transfer, communicate, both the unique identifies and associated meta-data between different systems and/or machines in different channels, for example using a system that is capable of talking to a database and various devices, i.e. taking information to and from various devices being used to interact, e.g. software that enables the connectivity via, for example, the Web, social, speech, IVR, television, automotive, chat, mobile, etc.;

A system and/or machine that can access, index, and use the associated meta-data immediately, based on the unique identifier and that can personalize, focus, tune, optimize, and/or predict the customers experience moving forward, based upon the meta-data and unique identifier, on one or more channels either sequentially or concurrently, for example in a system that is capable of database maintenance and that contains algorithms for maintaining lists, assigning matters to various customers, etc. Further, the algorithm would work on data received or collected from various devices, or it could be accessed to get data (see, for example, FIGS. 2 and 3, discussed above);

A system and/or machine that can seamlessly and continuously link customer actions and steps across multiple sequential and concurrent channels by matching and using the unique identifier associated with the specific consumer and the associated meta-data. In an embodiment of the invention, such a system can index, access, and create a unique tie between the user identity catalog and the meta-data catalog, as in the above embodiments. The system can automatically review, either in real-time or off-line, a stream of data to query and identify key clusters of meta-data that have been determined to be viable fingerprints. When viable clusters are found, the system looks to see if they match an existing ID. If so, the system then associates them to that unique id from the id catalog. If a match is not found, the system then creates a linkage to a new, clean, unused ID; and A system and/or machine that tracks and reports on all behavior, engagement, success and/or failure, context passing and/or usage, prediction, customer satisfaction and/or effort related to the deployment and use of this multi-channel, multi-modal, unique identifier assignment, management, and experience system and/or machine, for example by tying all the channels based on the customer identification across channels. In such case, all the data is stored in a central data storage system, which can be a distributed system, as in case of cloud services. The data records can be tied with each other based on customer identification keys. This provides the required data.

Examples of unique identifiers include: a uniquely generated hash code sequence of numbers and/or letters and/or symbols and/or images and/or sounds; words, in any language or combination of languages, or combinations of words; phases in any language or combination of languages; sentences; paragraphs; verses; lyrics; quotations; titles to movies or television shows, books, poems, songs, albums, etc.; names of famous people, actors, sports teams, events;

locations; terms; any combination of the above; and/or private personally identifiable information, such as for example: ANI, email address, customer name, customer ID, user ID, username, account number, card number, registration number, and vehicle number.

For example, for string based identifiers, such as song titles, book titles, movie titles, an embodiment of the invention directly converts such identifiers to a unique numerical value using their ASCII letters as digits, after which such information is handled in the same manner as for any other numerical data. Another embodiment of the invention performs a simple unique hashing function on the original siring data to transform it into a number. Another embodiment of the invention creates a simple data structure with the string as one item and an either deterministically assigned or randomly assigned unique number as the other item that is always linked to the string. In another embodiment of the invention, a machine generated ID, such as a cookie based ID is generated during interaction with the device and the customer.

Embodiments of the invention find application in any of customer service, sales, retention, or any consumer-to-consumer, business-to-consumer, business-to-business interaction, to enable the unique identification and tracking of a visitor, consumer, business', and/or customer's behavior and actions across one or more channels. In this way, the invention provides a seamless transition of all context, history, and preferences to deliver, inter alia effective, easy, intuitive, and predictive service resolution; sales conversion; customer retention; reduced customer effort; and increased customer satisfaction.

Embodiments of the invention provide full customer flexibility to either provide or receive an easy to remember and user unique identifier which enables customers to be recognized by systems and/or machines across one or more channels without requiring the customer to provide any proprietary, personally identifiable information. Because the customer has liberty of choosing the key in certain cases, unlike the usual scenarios where key is assigned or authentication is required, the whole experience is more intuitive. This decouples identification from identity and authentication, and thus automatically and predictively uses and machine manages a set of commonly known and remembered identifiers, thereby enabling matching, blocking, communication, association, and experience customization based on the unique identifier and associated context.

Embodiments of the invention can also eliminate the requirement for the user to provide or receive the unique identifier and, instead, automatically assigns linkages and identifies associate customers with key similarities in metadata dusters, including a statistical scoring of confidence in the associations made.

An embodiment of the invention identifies key similarities and sets of metadata that can predict that two customers have the same identity within and across channels, devices, and within and across sessions.

An embodiment of the invention interacts with the customer to confirm, validate, and/or test the accuracy of whether the automatically established and/or predicted linkages are accurate and then automatically updates confidence levels and the prediction based on the customer's input.

An embodiment of the invention uses machine learning to continuously improve the methodology of the clustering, the type and specific metadata included in the clustering, and the initial prediction accuracy of linkages and associations from both automated correct/incorrect prediction feedback and indicators, environmental and/or inferred correct/incorrect prediction feedback and indicators, and direct correct/incorrect prediction feedback from the customer.

Example Embodiments

Figure 1:
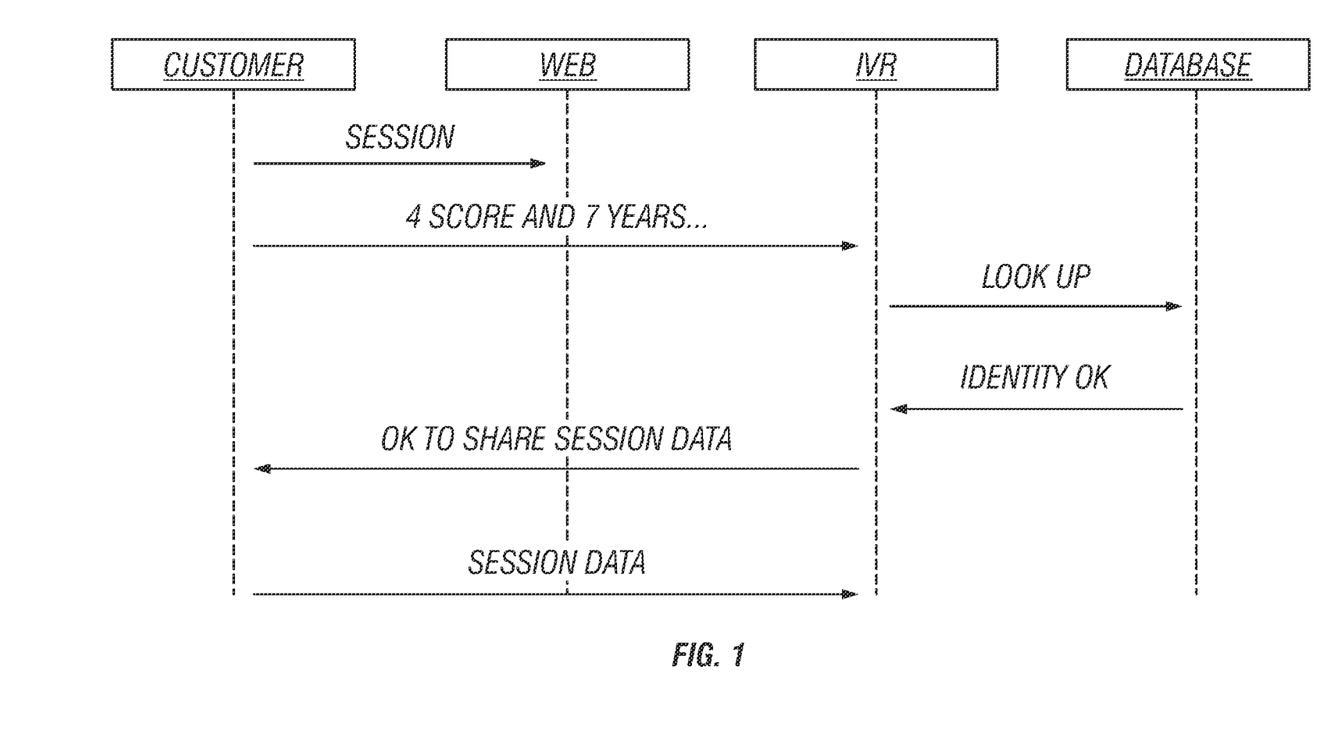
FIG. 1 is a process flow diagram that shows the linking of a unique customer identification element and customer behavior between concurrent and/or sequential channels of behavior according to the invention.

FIG. 1 is a process flow diagram that shows the linking of a unique customer identification element and customer behavior between concurrent and/or sequential channels of behavior according to the invention. In FIG. 1, an embodiment of the invention provides an online system which offers the Web visitor a unique phrase from Bartlett's Familiar Quotations, i.e. "4 Score and 7 Years" that they can then use when they interact with a speech IVR to trigger the full passing via computer telephony integration (CTI) of all their Web browsing, customer relations management (CRM), cart, action, clickstream behavior to either the IVR system or a live voice agent to pick-up their journey right from the step that they left off when they exited the Web and passed on to the phone. In embodiments of the invention that provide voice-based choices, the automatic speech recognition (ASR) engine may be enhanced to identify a limited set of grammars, e.g. for such quotations, etc.

In case of fingerprints or patterns, such as cell phone locks, the data storage is in the form of numbers, sequences, etc. Similarly and symmetrically another embodiment of the invention provides a pass phrase visually and the customer types the pass phrase. In both cases, either a verbal query and recognition, or a visual query and recognition, or a mix of either is used to collect and validate the information.

A further embodiment of the invention provides a system and/or machine that automatically manages and recycles the assignment of unique identifiers based on, e.g. usage, expiration, time, day, season, product, topic, etc. to optimize performance. Basic logic determines validity within a specific time period, e.g. a day after the interaction when the identifier was assigned. Probabilistic approaches are based upon a combination of time lapse from the interaction where identifier was assigned, IP address or location, or ANI to predict if the individual is the same customer. Machine learning and/or statistical models can be built for the same purpose, based on historic data, e.g. a simple database system that enables assignment, query, search, and management combined with a business rules engine which allows the encoding of the various management constraints and processes.

A further embodiment of the invention does not require any user inputs, i.e. the system automatically identifies a set of customer behaviors that occur separately, within or across channels and devices and within and across sessions. In this embodiment, the system makes an association of these different behavior clusters to the same individual, assigns a unique identifier to the individual, continues to track two or more behavior and/or journey sets as belonging to the same individual, and then passes context, behavior, and predictions based on this larger set. This embodiment of the invention also learns from contextual interaction and feedback, from environmental interaction and feedback, and from direct interaction and customer feedback as to whether an automated prediction and linkage are correct or incorrect. The system updates both the sets of metadata that are used and the confidence levels both for the specific individual and for the complete system so that future predictions of identity and associations of behavior and/or journey sets are continuously improved and increasingly accurate.

Use Cases

Embodiments of the invention provide for better personalization and, hence, better customer service. In case of a login issue, the customer can directly be given a prompt to check if he is having a login issue, or the customer can be routed to the appropriate agent, where agent is already made aware of the customer's problem via a database appropriate mechanism at the agent end. Similarly, embodiments of the invention comprehend the passing of information, i.e. identified intent, across sessions identified as belonging to the same customer to provide the right options, up sell and/or cross sell, discount offers, or other information that is passed to agents via chat and/or voice. In this way, the agents can address the issue faster and better.

Customer intent in a specific session can itself be predicted based on all of the information available about the customer across channels, firms, demographics, etc. using various models or business rules.

Another specific example of use case is when the customer is having a problem with a transaction and calls for assistance. Based on either location information deciphered from the customer's IP address or base on ANI, which can be a generic ANI such as that of a hotel, it is possible to associate the customer sessions and offer help to get the transaction completed immediately, or to provide the right information to the customer.

Another example is in case of a customer browsing on a mobile device for a specific product, but visiting a Website on a laptop, tablet, etc. to make the purchase. In this case, as mentioned above, embodiments of the invention use the customer's IP address and browsing patterns during the session on a non-mobile device to tie to the session in the mobile device, such that appropriate personalization, such as recommendations associated with the particular product or discount, are provided.

Similar aspects can be used to address the customer appropriately on non customer support channels, such as providing proper targeting ads on social networking sites.

Computer Implementation

FIG. 2 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment., one skilled in the art will readily appreciate that other applications may be substituted for those set forth herein without departing from the spirit and scope of the present invention. Accordingly, the invention should only be limited by the Claims included below.

Figure 4:
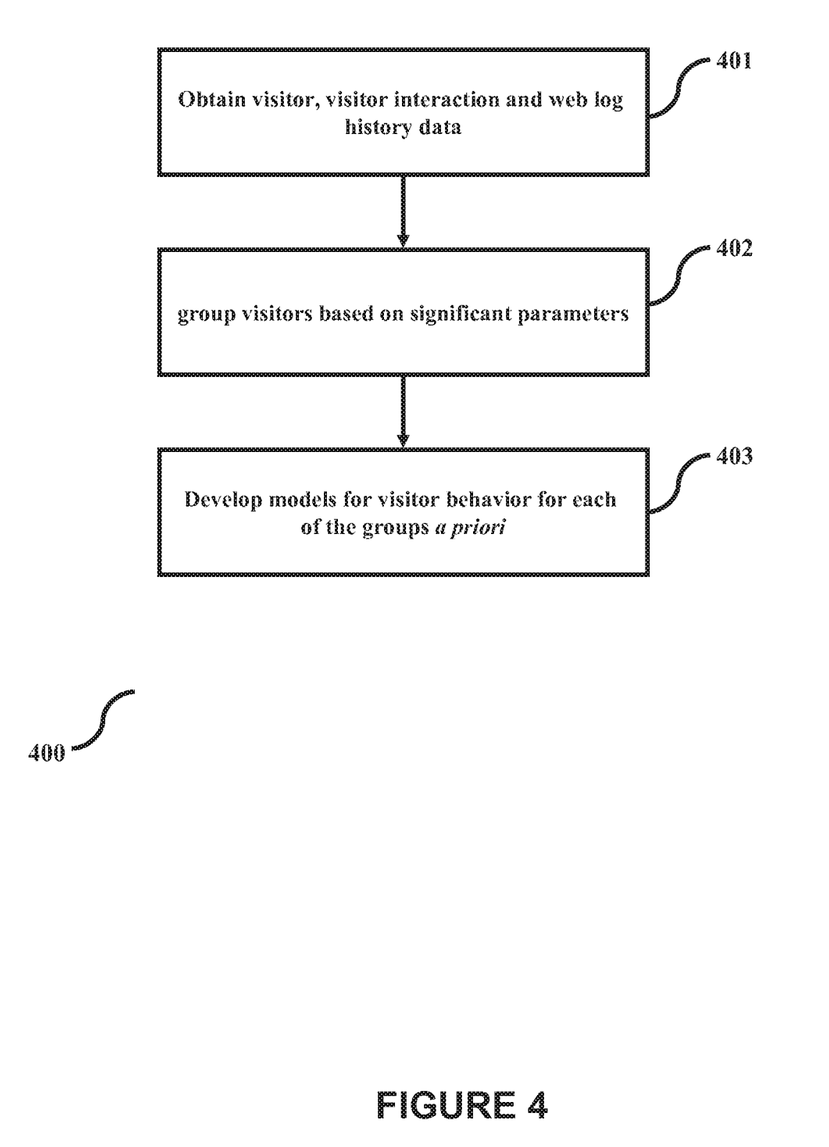
FIG. 4 is a block schematic diagram that depicts a machine in the exemplary form of a computer system within which a set of instructions for causing the machine to perform any of the herein disclosed methodologies may be executed.

FIG. 4 is a flowchart depicting a process of grouping visitors into a plurality of groups according to the invention. The intent prediction engine 203 fetches (401) a plurality of factors comprising, for example, locations of the visitors, time of visit, referral page, landing and/or exit pages, visitor interaction information, past purchase history, and so on related to visitors. The intent prediction engine 203 groups (402) the visitors based on the plurality of factors into a plurality of groups. The groups may be formed on the basis of behavior of the visitors, which may be based on the above mentioned plurality of factors. The intent prediction engine 203 further develops (403) models for visitor behavior for each of the groups. The various actions in method 400 may be performed in the order presented, in a different order, or simultaneously. Further, in some embodiments, some actions listed in FIG. 4 may be omitted.

Figure 5:
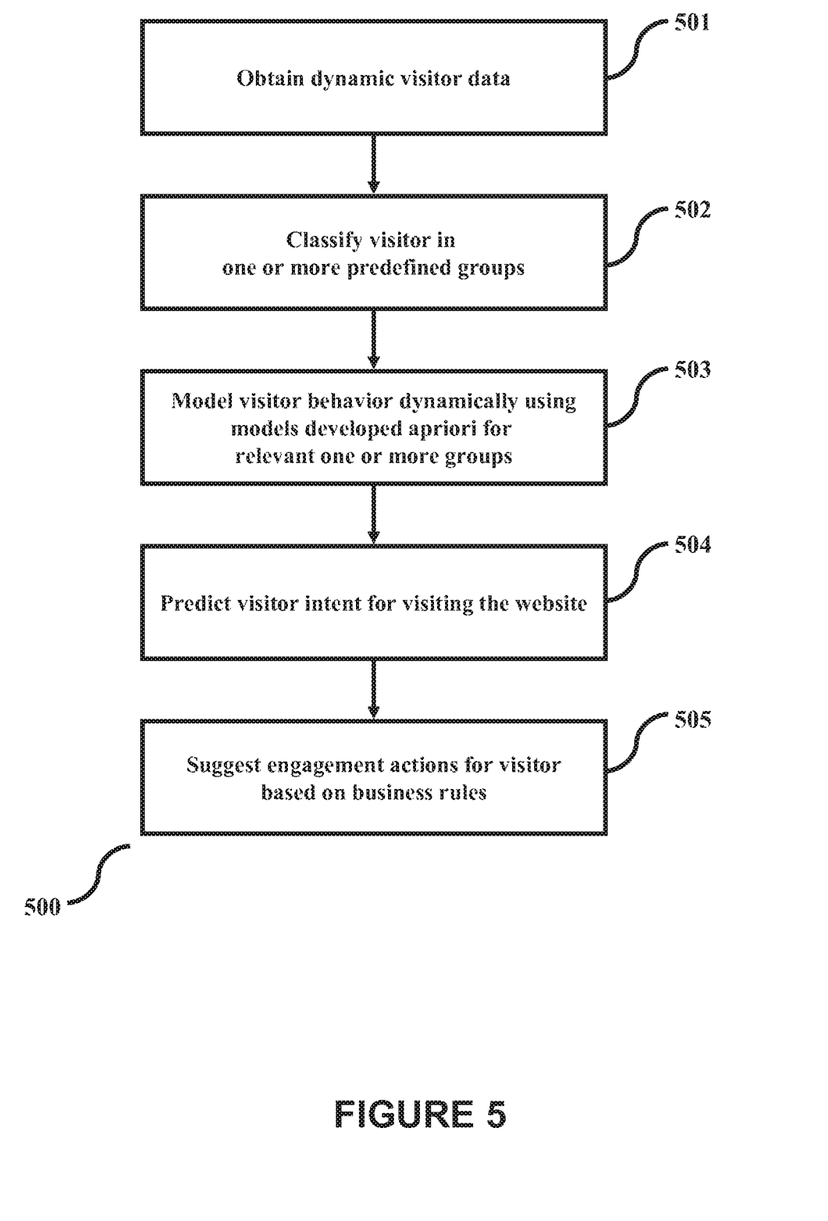

FIG. 5 is a flowchart depicting a process of predicting the current visitors into a plurality of groups and suggesting appropriate actions according to the invention. On detecting a visitor 101 accessing an application served by the servers 104, the intent modeling engine 203 obtains (501) partial Web journey data, such as location of the visitor, time of visit, referral page, landing pages, visitor interaction information, and so on. The intent modeling engine 203 further classifies (502) the visitor into one or more identified groups of visitors in (403) and models (503) the visitor behavior with respect to previous population of visitors in the relevant group identified. The intent modeling engine 203 predicts the intention of the visitor 101 based on modeling of the visitor behavior. The intent modeling engine 203, based on the predicted intent, proactively suggests (505) suitable personalized engagement actions which may be in the form of recommendations and/or best multichannel support to the visitor 101. The various actions in method 500 may be performed in the order presented, in a different order or simultaneously. Further, in some embodiments, some actions listed in FIG. 5 may be omitted.

1. A computer implemented method for addressing needs of a visitor accessing a website, comprising:
a processor collecting information about each visitor accessing the website and storing the information in a database;
said processor training a visitor intent model based on historical visitor information stored in the database;
said processor collecting information about a particular visitor;
said processor determining a group with which to associate the particular visitor based on the collected information about the particular visitor; and
after the visitor intent model is trained, said processor predicting intent of a particular visitor accessing the website based on information about the particular visitor and the visitor intent model.

4. The method of claim 1, wherein predicting intent of the particular visitor comprises:
said processor executing the visitor intent model to determine the predicted intent of the particular visitor using the group associated with the particular visitor and the information collected about the particular visitor.

The invention claimed is:

1. A computer implemented method for multi-channel customer identification of a customer, comprising:
creating a unique customer identifier;
identifying, with a processor, a contextual customer behavior for a plurality of channels of customer engagement;
said processor capturing, collecting, and storing said contextual customer behavior as meta-data, and associating said meta-data with said unique customer identifier;
said processor automatically identifying a set of contextual customer behaviors that occur separately, within or across said plurality of channels and devices and within and across sessions to automatically predict that two contextual customer behaviors have a same customer identity within and across said plurality of channels, devices, and within and across sessions;
wherein said contextual customer behavior comprises a customer intent;
wherein said customer intent is predicted based on said processor training a customer intent model comprising a machine learning model using structured data format comprising a location of said customer, a time of visit, and a referral page, said processor training comprising:
said processor grouping a plurality of customers into one or more groups of a plurality of groups;
said processor developing models for a customer behavior for each of said groups;
said processor determining a group with which to associate said customer based on collected information about said customer by modeling said customer behavior with respect to a previous population of customers in an identified group;
after said customer intent model is trained, said processor predicting said customer intent of said customer based on information about said customer and said customer intent model by executing said customer intent model to determine said customer intent of said customer based upon said group associated with said customer and information collected about said customer; and wherein said contextual customer behavior further comprises any of:
historical behavior of said customer in one or more said plurality of channels, said plurality of channels comprising any of Web, IVR, phone, and CRM;
previous customer experiences including any of success, failure, satisfaction, and complaints;
customer browsing, including any of purchasing, servicing, social, credit, viewing actions, and behaviors and sequences;
customer preferences;
customer journeys;
customer progress comprising any of cart and order contents;
customer status; and
customer data from social sites and blogs;
said processor, using machine learning, linking said unique customer identifier and said contextual customer behavior in real time between any of said plurality of channels of customer engagement by matching and using said unique customer identifier associated with said customer and associated meta-data to identify and tag said customer and said contextual customer behavior uniquely, wherein said plurality of channels are accessed any of concurrently and sequentially.

2. The method of claim 1, wherein said unique customer identifier comprises any of:
a uniform resource locator (URL);
a uniquely generated hash code sequence of numbers;
a uniquely generated hash code sequence of letters;
a uniquely generated hash code sequence of symbols;
a uniquely generated hash code sequence of images;
a uniquely generated hash code sequence of sounds;
words, in any language or combination of languages, or combinations of words;
phases in any language or combination of languages;
sentences;
paragraphs;
verses;
lyrics;
quotations;
titles to any of movies, television shows, books, poems, songs, and albums;
names of any of famous people, actors, sports teams, and events;
locations;
terms;
any combination of the above; and
private personally identifiable information comprising any of ANI, email address, customer name, customer ID, user ID, username, account number, card number, registration number, vehicle number, and combinations thereof.

3. The method of claim 1, further comprising:
providing any of a catalog, library, and collection of unassigned unique customer identifiers stored in any of encrypted and free-text for use to create said unique customer identifier.

4. The method of claim 1, further comprising:
creating new unique customer identifiers; and
automatically adding said new unique customer identifiers to any of an original catalog or library.

5. The method of claim 1, further comprising:
managing one or more catalogs of unique customer identifiers.

6. The method of claim 1, further comprising:
any of scoring, ranking, and prioritizing said unique customer identifier by any of ease of remembrance, ease of engagement, ease of acceptance, and ease of use.

7. The method of claim 1, further comprising:
selecting and assigning said unique customer identifier to said customer randomly.

8. The method of claim 1, further comprising:
interacting with said customer in one or more said plurality of channels for any of communicating and assigning an identifier to said customer uniquely.

9. The method of claim 1, further comprising:
any of collecting, interacting, requesting, and interrogating said customer to obtain an input from said customer for use as said unique customer identifier.

10. The method of claim 1, further comprising:
any of managing, optimizing, and recycling any of a limited and unlimited number of unique customer identifiers to optimize any of performance, access, storage, and other desired metrics based on a set of parameters comprising any of age, usage, clean or dirty, time of day, seasonality, product, and customer segment.

11. The method of claim 1, further comprising:
any of sharing, transferring, and communicating, both said unique customer identifier and said associated meta-data between different systems in different channels.

12. The method of claim 1, further comprising:
any of accessing, indexing, and using said associated meta-data in real time, based on said unique customer identifier, for any of personalizing, focusing, tuning, optimizing, and predicting a customer's experience moving forward, based on said meta-data and said unique customer identifier, on one or more said plurality of channels either sequentially or concurrently.

13. The method of claim 1, further comprising:
seamlessly and continuously linking customer actions and steps across multiple sequential and concurrent channels by matching and using said unique customer identifier associated with a specific customer and said associated meta-data.

14. The method of claim 1, further comprising:
tracking and reporting on said contextual customer behavior, engagement success and failure, context passing and usage, prediction, and customer satisfaction and effort in connection with deployment and use of a multi-channel, multi-modal, unique customer identifier assignment, management, and experience system.

15. The method of claim 1, further comprising:
automatically managing and recycling assignment of unique customer identifiers based on any of usage, expiration, time, day, season, product, topic.

16. A computer implemented method for multi-channel customer identification, comprising:
a processor capturing, collecting, and storing a contextual customer behavior as meta-data;
said processor automatically identifying a set of contextual customer behaviors that occur separately, within or across a plurality of channels and devices and within and across sessions to automatically predict that two contextual customer behaviors have a same customer identity within and across said plurality of channels, devices, and within and across sessions;
wherein said contextual customer behavior comprises a customer intent;
wherein said customer intent is predicted based on said processor training a customer intent model comprising a machine learning model using structured data format comprising a location of said customer, a time of visit, and a referral page, said processor training comprising:
said processor grouping a plurality of customers into one or more groups of a plurality of groups;
said processor developing models for a customer behavior for each of said groups;
said processor determining a group with which to associate a customer based on collected information about said customer by modeling said customer behavior with respect to a previous population of customers in an identified group;
after said customer intent model is trained, said processor predicting said customer intent of said customer based on information about said customer and said customer intent model by executing said customer intent model to determine said predicted customer intent of said customer based upon said group associated with said customer and information collected about said customer; and
wherein said contextual customer behavior further comprises any of:
historical behavior of said customer in one or more said plurality of channels, said plurality of channels comprising any of Web, IVR, phone, and CRM;
previous customer experiences including any of success, failure, satisfaction, and complaints;
customer browsing, including any of purchasing, servicing, social, credit, viewing actions, and behaviors and sequences;
customer preferences;
customer journeys;
customer progress comprising any of cart and order contents;
customer status; and
customer data from social sites and blogs;
said processor, using machine learning, making an association of meta-data in different contextual customer behavior clusters to a same customer;
said processor assigning a unique customer identifier to said customer;
said processor tracking a larger information set comprising any of two or more contextual customer behavior sets and journey sets as belonging to said same customer by matching and using said unique customer identifier associated with said customer and associated meta-data; and
said processor outputting context, behavior, and predictions based on said larger information set.

17. The method of claim 16, further comprising:
said processor determining from any of contextual interaction and feedback, environmental interaction and feedback, and direct interaction and customer feedback whether an automated prediction and linkage is correct or incorrect.

18. The method of claim 16, further comprising:
said processor updating said larger information set and confidence levels both for said customer and for an overall database, wherein predictions of identity and associations of behavior and/or journey sets are continuously improved and increasingly accurate.

19. The method of claim 1, further comprising:
said processor determining from contextual interaction and feedback, from environmental interaction and feedback, and from direct interaction and customer feedback whether an automated prediction and linkage is correct or incorrect; and said processor updating said meta-data used and associated confidence levels both for said customer and overall to continuously improve an accuracy of future predictions of customer identity and associations of behavior and/or journey sets to a specific customer.

\* \* \* \* \*